United States Patent [19]

Goswami et al.

[11] 4,187,159

[45] Feb. 5, 1980

[54] PROCESS FOR FORMING A CROSSLINKED POLYVINYL CHLORIDE FOAM AND PRODUCT THEREOF BY MEANS OF RADIATION CROSSLINKING

[75] Inventors: Jagadish C. Goswami, New City, N.Y.; Arthur J. Yu, Stamford, Conn.

[73] Assignee: Stauffer Chemical Company, Westport, Conn.

[21] Appl. No.: 709,563

[22] Filed: Jul. 28, 1976

Related U.S. Application Data

[63] Continuation of Ser. No. 538,623, Jan. 6, 1975, abandoned.

[51] Int. Cl.$^2$ .............................................. C08F 8/00
[52] U.S. Cl. ............................ 204/159.17; 521/145; 521/150; 521/915
[58] Field of Search ................ 260/2.5 P; 204/159.2, 204/159.17; 521/145, 915, 150

[56] References Cited

U.S. PATENT DOCUMENTS

| | | | |
|---|---|---|---|
| 2,952,593 | 9/1960 | Rubens | 204/159.2 |
| 3,359,193 | 12/1967 | Pinner | 204/159.17 |
| 3,539,488 | 11/1970 | Klopfer et al. | 204/159.17 |
| 3,542,661 | 11/1970 | Klopfer et al. | 204/159.17 |
| 3,709,806 | 1/1973 | Minami et al. | 204/159.2 |
| 3,816,284 | 6/1974 | Kagiya et al. | 204/159.17 |

FOREIGN PATENT DOCUMENTS 1219803 1/1971 United Kingdom .

*Primary Examiner*—Richard B. Turer
*Attorney, Agent, or Firm*—Richard P. Fennelly

[57] ABSTRACT

Crosslinked polyvinyl chloride foams are formed by first expanding a polyvinyl chloride containing plastisol comprising a blowing agent, and a reactive crosslinking plasticizer to form a foamed composition and then subjecting the foamed composition to irradiation to crosslink the foamed composition via the crosslinking plasticizer.

10 Claims, No Drawings

PROCESS FOR FORMING A CROSSLINKED POLYVINYL CHLORIDE FOAM AND PRODUCT THEREOF BY MEANS OF RADIATION CROSSLINKING

This is a continuation of application Ser. No. 538,623 filed Jan. 6, 1975, now abandoned.

TECHNICAL DESCRIPTION OF THE INVENTION

Crosslinked polyvinyl chloride foams have traditionally been formulated by using a chemical crosslinking system. Examples are described in U.S. Pat. No. 3,484,352 and in Rubber and Plastics Age, pages 522, 524–525 (June, 1968). Recently it has been proposed that radiation be used as a crosslinking vehicle in forming polyvinyl chloride foams. One such process is described in British Pat. No. 1,219,803 which relies upon exposing a divinyl monomer-containing foamable plastisol to radiation and then the expansion of the composition by heating. Such a process gives a product having poor cell quality and a lower density and a lower tensile strength than the ones produced according to the present invention.

The present invention, unlike the process shown in the above mentioned British patent, comprises a process for forming a crosslinked polyvinyl chloride foam which first entails expanding a polyvinyl chloride plastisol composition containing a reactive crosslinking plasticizer followed by irradiation of the expanded specimen to crosslink the foamed composition.

The plastisol composition which is to be initially expanded comprises from about 40% to 75% by weight of a polyvinyl chloride homopolymer or copolymer which preferably has a particle size of from about 0.3 microns to 3 microns and a relative viscosity (as measured in a 1% solution of cyclohexanone at 25° C.) of from about 1.6 to about 2.6. Any polyvinyl chloride homo- or copolymer meeting these requirements may be used.

The plastisol composition also comprises from about 5% to about 50% by weight of at least one polyethylenically unsaturated reactive plasticizer. Such a plasticizer is one which contains at least two ethylenically unsaturated bonds thereby having the ability to crosslink with the vinyl polymer. Suitable plasticizers are those of the general type that is described in British Pat. No. 1,219,803 and include diallyl phthalate, allyl methacrylate, divinyl benzene, diethylene glycol dimethacrylate, ethylene glycol dimethacrylate, trimethylolpropane trimethacrylate, diallyl adipate, 2-vinyl oxyethyl ether, methylene-bis-acrylamide, diethylene glycol diacrylate, ethylene glycol diacrylate, divinyl ether, diallyl fumarate, divinyl sulfone, divinyl carbitol, butylene dimethacrylate, trimethylene glycol diacrylate, butylene glycol diacrylate, pentamethylene glycol diacrylate, glyceryl triacrylate, octylene glycol diacrylate, trimethylene propane triacrylate, the tetraacrylate ester of pentaerythritol and the diallyl phosphonates such as ethyl diallylphosphonate.

The plastisol also contains from about 1% to 15% of a conventional blowing agent which is selected according to the relative viscosity of the copolymer. Preferred are azodicarbonamide, p,p'-oxy-bis(benzene sulfonylhydrazide), barium azodicarboxylate, and the like.

In addition to the foregoing major components the plastisol may contain heat stabilizers, e.g., dibasic lead phthalate, blowing agent catalysts and other conventional functional additives. If desired, conventional non-reactive plasticizers can be included although their presence is normally not needed.

Once the plastisol composition is thoroughly mixed it is expanded using conventional procedures, e.g., by being heated to a temperature of about 185° C. to about 220° C. for about 2 min. to about 20 min., to allow decomposition of the blowing agent and foaming of the plastisol.

After the plastisol has been foamed, it is then subjected to irradiation, e.g., by alpha particles, gamma rays, beta rays from a radioactive source, electron beams, x-rays or ultraviolet rays, preferably by electron beam irradiation, of from 50,000 to 20,000,000 electron volts until a dosage of from about 0.5 to about 3 megarads is applied. The radiation crosslinks the foamed composition so that a dimensionally stable foamed polyvinyl chloride product is formed. The product can be used in cushioning and as an insulator, if desired.

EXAMPLE I

The following ingredients were mixed together to form a foamable plastisol composition:

| Reagent | Parts by Weight |
| --- | --- |
| Polyvinyl Chloride Resin (available as SCC-20 from Stauffer Chemical Co.) | 100 |
| Reactive Plasticizer (Santoset-I, sold by Monsanto)* | 45 |
| Trimethylol propane trimethylacrylate | 45 |
| Dibasic lead phthalate** | 3 |
| Azodicarbonamide Blowing agent*** | 5 |
| Blowing agent catalyst+ | 0.5 |
| Blowing agent catalyst++ | 0.5 |

*Santoset-I comprises approximately: 40.3 mole % diallyl phthalate; 39.2 mole % isooctyl fumarate; and 19.5 mole % nonyl or decyl fumarate.
**sold by National Lead Co. as Dythal XL.
***A 50:50 by weight Celogen AZ-Dioctyl phthalate paste. Celogen AZ is sold by Uniroyal Chemical Division, Naugatuck, Conn.
+ ABS-1 sold by Advance Division of Carlisle Chemical Works, Inc.
++ ABC-2 sold by Advance Division of Carlisle Chemical Works, Inc.

The above ingredients were first mixed in a Hobart mixer for about 15 minutes and then in a three roll mill (one pass) followed by deaeration under vacuum for about 10 minutes.

The plastisol was then subjected to an expansion step by drawing twenty-five mil thickness films with a doctor blade onto cold rolled steel plates. These films were heated in a forced air oven at 200°–205° C. for about two minutes. The thickness of the expanded foams varied between 58 and 68 mil with a density of 17 lbs./ft.$^3$.

EXAMPLE II

A series of the expanded foams from Example I were subjected to a variety of doses of high speed electrons. The Table sets forth the data for the foams which resulted as well as for a control foam which received no irradiation.

TABLE

| Sample No. | Dose (Megarad) | Feel before Exposure | Feel after Exposure | % Gel Content | Tensile Strength at break**(psi) |
| --- | --- | --- | --- | --- | --- |
| Control | 0 | Soft, flexible | soft, flexible | 0 | 214 |

TABLE-continued

| Sample No. | Dose (Megarad) | Feel before Exposure | Feel after Exposure | % Gel Content | Tensile Strength at break**(psi) |
|---|---|---|---|---|---|
| 1 | 0.5 | " | " | 26.4 | 350 |
| 2 | 1.0 | " | " | 54.0 | 333 |
| 3 | 3.0 | " | Brittle | 88.5 | — |

*by weight, measured from the residue of the irradiated foam after repeated Soxhlet extractions with tetrahydrofuran.
**measured according to ASTM D-882.

The above Examples illustrate certain preferred embodiments of the present invention and are merely illustrative. The appended claims set forth the scope of protection that is sought.

What is claimed:

1. A process for forming a crosslinked polyvinyl chloride foam which comprises:
    (a) expanding a plastisol composition which consists essentially of polyvinyl chloride, a blowing agent, and a reactive plasticizer which contains at least two ethylenically unsaturated bonds, to form a foamed composition; and
    (b) exposing said foamed composition to radiation of from 50,000 to 20,000,000 electron volts until a dosage of from about 0.5 to about 3 megarads is applied to crosslink the foamed composition and form a dimensionally stable foamed product.

2. A process as claimed in claim 1 wherein the polyvinyl chloride comprises about 40% to 75% by weight of the plastisol.

3. A process as claimed in claim 1 wherein the blowing agent comprises about 1% to 15% by weight of the plastisol.

4. A process as claimed in claim 1 wherein the blowing agent is azodicarbonamide.

5. A process as claimed in claim 1 wherein the reactive plasticizer comprises about 5% to about 50% by weight of the plastisol.

6. A process as claimed in claim 1 wherein the reactive plasticizer is diallyl phthalate.

7. A process as claimed in claim 1 wherein the reactive plasticizer is trimethylolpropane trimethacrylate.

8. A process as claimed in claim 1 wherein the plastisol is expanded at about 185° C. to about 225° C.

9. A process as claimed in claim 1 wherein the foamed composition is irradiated with an electron beam to crosslink the foamed composition.

10. A product formed by the process of claim 1.

* * * * *